(12) United States Patent
Sakamoto et al.

(10) Patent No.: US 6,694,676 B2
(45) Date of Patent: Feb. 24, 2004

(54) CENTER-MATCHED DOUBLE HINGED DOOR ASSEMBLY FOR VEHICLES

(75) Inventors: Toshinori Sakamoto, Hiroshima (JP); Yoshio Fukushima, Hiroshima (JP); Tomoo Taguchi, Hiroshima (JP)

(73) Assignee: Mazda Motor Company, Hiroshima (JP)

( * ) Notice: Subject to any disclaimer, the term of this patent is extended or adjusted under 35 U.S.C. 154(b) by 0 days.

(21) Appl. No.: 10/015,277

(22) Filed: Dec. 12, 2001

(65) Prior Publication Data
US 2002/0073623 A1 Jun. 20, 2002

(30) Foreign Application Priority Data
Dec. 14, 2000 (JP) ........................ 2000-379830

(51) Int. Cl.7 .............................. E05C 7/04; E05C 3/06; E05B 65/06
(52) U.S. Cl. .................. 49/366; 49/394; 292/DIG. 21; 292/216
(58) Field of Search .......................... 49/366, 118, 116, 49/61, 67, 63, 394, 381, 26–28, 108, 110; 292/DIG. 21, DIG. 29, 216, 335, 332; 296/146.9, 146.1, 146.6

(56) References Cited

U.S. PATENT DOCUMENTS

| 2,997,336 | A | * | 8/1961 | Huggins et al. ..... 296/146.9 X |
| 3,719,380 | A | * | 3/1973 | Watermann ................. 292/216 |
| 3,832,804 | A | * | 9/1974 | Goldsmith ................ 49/394 X |
| 4,412,695 | A | * | 11/1983 | Arlauskas ................ 292/216 X |
| 4,674,230 | A | * | 6/1987 | Takeo et al. ................ 49/28 X |
| 4,930,836 | A | | 6/1990 | Grinn |
| 5,074,073 | A | * | 12/1991 | Zwebner ......................... 49/26 |
| 5,688,004 | A | * | 11/1997 | Karge .............. 292/DIG. 29 X |
| 5,800,007 | A | * | 9/1998 | Cho ........................ 296/146.6 |
| 5,982,126 | A | * | 11/1999 | Hellinga et al. ............ 49/28 X |
| 6,059,352 | A | * | 5/2000 | Heldt et al. .............. 296/146.6 |
| 6,189,265 | B1 | * | 2/2001 | Fink ............................ 49/118 |
| 6,332,641 | B1 | * | 12/2001 | Okana ..................... 296/146.6 |
| 6,449,904 | B1 | * | 9/2002 | Paasonen .................. 49/366 X |

FOREIGN PATENT DOCUMENTS

| EP | 0 348 034 | 12/1989 |
| JP | 8-142680 | 6/1996 |
| JP | 11088672 | 3/1999 |

* cited by examiner

Primary Examiner—Hugh B. Thompson, II
(74) Attorney, Agent, or Firm—Brooks Kushman P.C.

(57) ABSTRACT

A center-matched double hinged door assembly for a vehicle having a continuous side aperture at each of opposite side of a vehicle body comprises a front door hinged at a rear end to the vehicle body, a rear door hinged at a front end to the vehicle body, and a door lock/unlock mechanism operative to prevent the rear door from opening prior to the front door while the front door remains closed, to allow the rear door to open while the front door remains open and to allow the rear door to close irrespective of whether the front door remains open or closed.

11 Claims, 18 Drawing Sheets

CENTER-MATCHED DOUBLE HINGED DOOR ASSEMBLY FOR VEHICLES

BACKGROUND OF THE INVENTION

1. Field of the Invention

The present invention relates to a locking/unlocking mechanism for a center-matched double hinged door assembly for a vehicle body which has a closed position wherein a continuous aperture formed as a doorway at a side of the vehicle body is fully closed and an open position wherein the continuous aperture is fully opened.

2. Description of Related Art

Recent days some types of vehicles utilize double hinged door assemblies that open and close an aperture formed at the back of a vehicle body. One example of such a double hinged door assembly, that is installed to a van, is disclosed in Japanese Unexamined Patent Publication No. 8-142680. The double hinged door assembly installed as a back door to a van type of vehicle body comprises right and left hinged doors and a lock pillar having right and left strikers. The lock pillar is provided with a pillar lock device and right and left door lock devices. The pillar lock device comprises a lock pillar handle, mounted on a pivot shaft and upper and lower locks connected to the pivot shaft through upper and lower rods, respectively. These upper and lower locks are engaged with and disengaged from upper and lower strikers, respectively, according operated states of the lock pillar handle. The right door is provided with a right lock device that comprises a right outer handle and a right lock interconnected to the right outer handle so as to engage with and disengage from the right striker. Similarly, the left door is provided with a left lock device that comprises a left outer handle and a left lock interconnected to the left outer handle so as to engage with and disengage from the left striker. The right and left doors can be independently opened by releasing the right and left lock devices, respectively.

Though the double hinged door assembly installed to the van is structured to close a back aperture through which the vehicle is loaded and unloaded with goods, the right and left doors of the double hinged door assembly can be applied to front and rear doors for a side door that open and closes a side continuous aperture as a doorway of a passenger car. In the case where the double hinged door assembly is installed to a passenger car, the rear door can be opened prior to and independently from the front door. In consequence, when the rear door is opened while the front door remains closed, the rear door is possibly opened before the vehicle stops. This leads to a problem of passenger's safety.

Another example of such a double hinged door assembly for side doors of a pick-up truck which has a continuous aperture extending from a front pillar to a rear pillar is disclosed in U.S. Pat. No. 4,930,836 to Gary J. Grinn. The double hinged door assembly comprises a front door mounted at the rear pillar, a front door pivotally mounted at the front pillar that moves to an overlying position with the rear door to effect closure of the reminder of the aperture, a primary latch assembly that is operatively disposed between the trailing edge of the front door and the leading edge of the rear door and a secondary latch assembly that is operatively disposed between portions of the vehicle body outside the continuous aperture. According to the double hinged door assembly, the rear door includes portions extending over the hinge mechanism through which pivotal mounting to the rear pillar is made to effect concealment of these hinges.

According to the double hinged door assembly, because the rear door is overlapped by the front door in their closed positions, the rear door is prevented from opening while the front door remains and, however, can not be closed when the front door is closed prior to the rear door.

SUMMARY OF THE INVENTION

It is an object of the present invention to provide a double hinged door assembly comprising front and rear hinged doors for a side door of a vehicle body having a continuous aperture as a doorway which provides reliable passenger's safety.

It is another object of the present invention to provide a double hinged door assembly comprising front and rear hinged doors for a side door of a vehicle body having a continuous aperture as a doorway which provides an increased degree of freedom of opening and closing the rear door, that is, which prevents the rear door from opening while the front door remains closed, allows the rear door to open while the front door remains open, and allows the rear door to close regardless of whether the front door remains open or closed.

The aforesaid objects of the present invention are accomplished by a center-matched double hinged door assembly for a vehicle body having a continuous aperture as a doorway formed at each of opposite sides of the vehicle body which is movable between a closed position wherein the double hinged door assembly fully closes the continuous aperture and an open position wherein the double hinged door assembly fully opens the continuous aperture and comprises a front door hinged at a front end to the vehicle body which is movable between the closed position wherein the front door closes front part of the continuous aperture and the open position wherein the front door opens the front part of the continuous aperture and a rear door hinged at a rear end to the vehicle body which is movable between the closed position wherein the rear door closes rear part of the continuous aperture and the open position wherein the rear door opens the front part of the continuous aperture. The double hinged door assembly includes door lock/unlock means for preventing the rear door from moving to the open position while the front door is in the closed position, allowing the rear door to move to the open position while the front door is in the open position and allowing the rear door to move to the closed position irrespective of the closed and open positions of the front door.

The continuous side aperture may form the front part for a doorway to a driver's seat or a front passenger's seat, and rear part of the doorway for rear passengers' seat.

According to the primary feature of the present invention, the lock/unlock control means prevents the rear door from opening while the front door remains closed, allowing the rear door to open while the front door remains open and further allowing the rear door to close irrespective of whether the front door remains closed or open. According to the center-matched double hinged door assembly that is structured so as to allow the front and rear doors to open in specified order, i.e. the rear door is allowed to open only after the front door opens, in consideration with passengers' safety, the rear door is unconditionally allowed to close while the front door remains open. This provides the rear door with high serviceability.

The lock/unlock control means may include door position detection means such as a door position detection means and a door sensor that operates to detect the front door in the closed and open positions. The lock/unlock control means allows the rear door to move to the open position while the door position detection means detects the front door in the open position and prevents the rear door from moving to the open position while the door position detection means detects the front door in the closed position. The center-matched double hinged door assembly detects front door positions accurately and quickly and control opening and closing the rear door according to the result of detection.

According to another feature of the present invention, the door lock/unlock means comprises a rear door handle which is installed to the rear door and is operated to unlock the rear door, a door lock unit which is operative to lock the rear door to the vehicle body when the rear door moves to the closed position and to keep the rear door locked to the vehicle body until the rear door handle is operated, and an interlocking mechanism disposed in the rear door. The interlocking mechanism operationally couples the rear door handle to the door lock unit together to connect operation of the rear door handle to the door lock unit so as thereby to allow the door lock unit to unlock the rear door from the vehicle door upon the operation of the rear door handle while the door position detection means detects the front door in the open position and operationally uncouples the rear door handle from the door lock unit to disconnect the operation of the rear door handle so as thereby to prevent the door lock unit from unlocking the rear door from the vehicle door irrespective of the operation of the rear door handle while the door position detection means detects the front door in the closed position. The interlocking mechanism makes operation of the rear door handle ineffective while the front door is in the closed position, so that the rear door remains closed even when the rear door handle is operated. Since the interlocking mechanism has no necessity of a mechanism to coercively stop a release member or the like, the lock/unlock means itself can have improved durability.

The interlocking mechanism may be such as to mechanically connect operation of the rear door handle to the door lock unit so as to unlock the rear door from the vehicle body upon the operation of the rear door handle. The interlocking mechanism thus structured is mechanically locked to prevent the operation of the rear door handle so as thereby to prevent the door lock unit from unlocking the rear door from the vehicle body while the door position detection means detects the front door in the closed position and being unlocked to allow the operation of the rear door handle so as thereby to unlock the rear door from the vehicle body upon the operation of the rear door while the door position detection means detects the front door in the open position. Otherwise, the interlocking mechanism may be frictionally braked to prevent the operation of the rear door handle so as thereby to prevent the door lock unit from unlocking the rear door from the vehicle body while the door position detection means detects the front door in the closed position and being released to allow the operation of the rear door handle so as thereby to unlock the rear door from the vehicle body upon the operation of the rear door while the door position detection means detects the front door in the open position.

This interlocking mechanism can reliably prevent the operation of the rear door handle while the front door is in the closed position and can be simplified in structure.

According to still another feature of the present invention, the door lock/unlock means comprises a latch slider installed to a front end of the rear door and forced to retractably project from the rear door and a stopper fixedly disposed on a rear end of the front door and engageable with the latch slider so as thereby to prevent the rear door from moving to the closed position while the front and rear doors are in the closed position. The latch slider has a front end facing the front door so shaped that, while the front door is in the closed position, the latch slider is forced back into the rear door by the stopper when the rear door moves toward the closed position and is brought into engagement with the stopper when the rear door reaches the closed position. The stopper may be formed as an integral part of the front door or a separate part from the front door.

With the lock/unlock control means, the stopper stops the latch slider forced out from the rear door when the rear door is pushed in an attempt to open the rear door while the front door remains in the closed position, the rear door is prevented from opening. On the other hand, the stopper forces back the latch slider into the rear door when the rear door is moved toward the closed position after the front door is closed, so that the rear door is completely closed. Since this lock/unlock control means basically comprises the stopper and the latch slider only, the lock/unlock control means can be simplified in structure and has no necessity of using electrical control and electric power.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENTS

Figure 1:
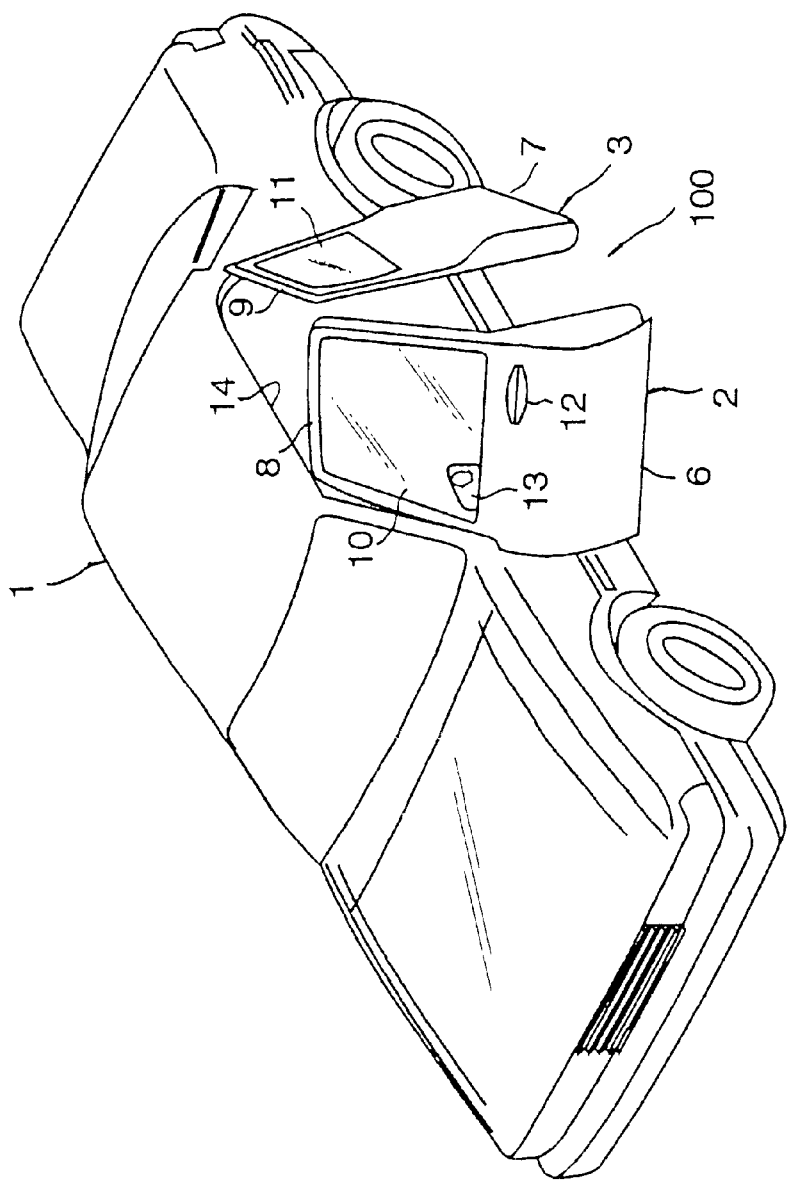
FIG. 1 is a perspective view of a vehicle equipped with a center-matched double hinged door assembly of the present invention.
Figure 2:
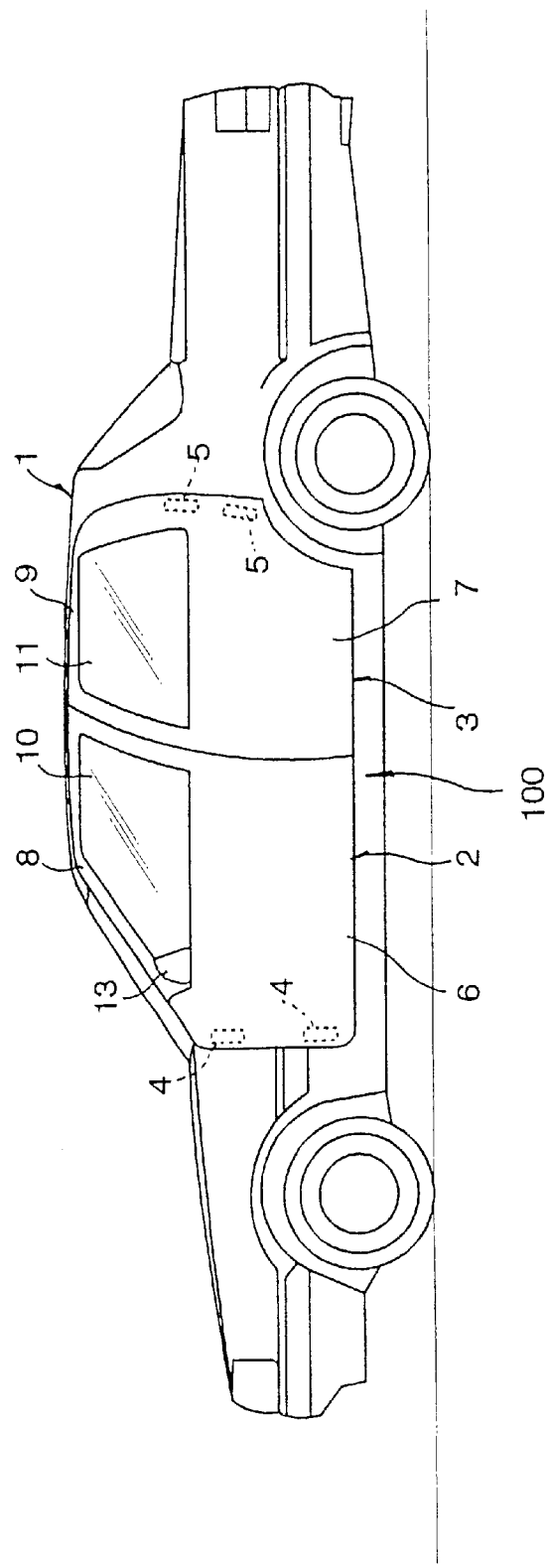
FIG. 2 is a side view of the vehicle
Figure 3:
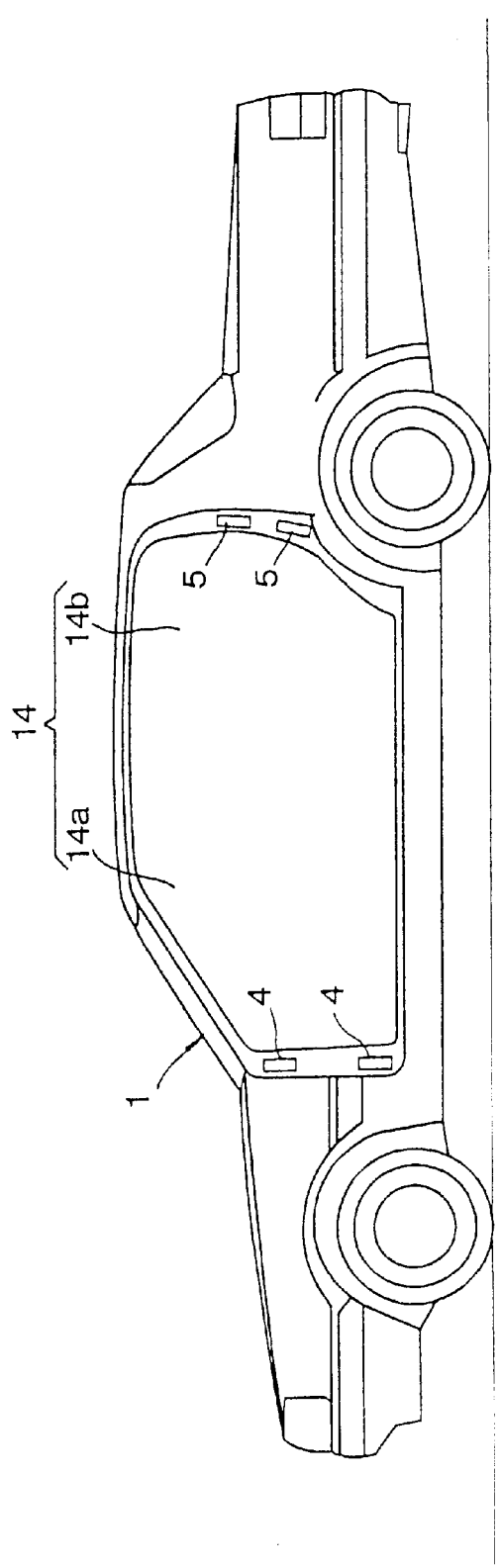
FIG. 3 is a side view of the vehicle with the center-matched double hinged door assembly removed.

Referring to the drawings in detail and, in particular, to FIGS. 1 to 3 showing a vehicle body 1 equipped with a center-matched double hinged door assembly 100 according to an embodiment of the present invention, the double hinged door assembly 100 is movable between a closed position wherein it fully closes a continuous aperture formed as a doorway at each of opposite sides of the vehicle body 1 and an open position wherein it fully opens the continuous side aperture. The double hinged door assembly 100 comprises a front hinged door 2 hinged at its front end to the vehicle body 1 by means of hinges 4 and a rear hinged door 3 hinged at a rear end to the vehicle body 1 by means of rear hinges 5. These front hinged door 2 and rear hinged door 3 are independently movable in opposite directions to each other so as to open and close a continuous side aperture 14 of the vehicle body 1, fully or partly. The continuous side aperture 14 forms a front half doorway 14a to a driver's seat or a front passenger's seat, and a rear half doorway 14b to rear passengers' seat. The front hinged door 2 comprises a front door panel assembly 6, a window glass 10 and a door frame 8. Similarly, the rear hinged door 3 comprises a rear door panel assembly 7, a window glass 11 and a door frame 9. Further, each of the front hinged door 2 and the rear hinged door 3 is provided with a side impact bar (not shown) extending in a lengthwise direction of the vehicle body 1 inside the door panel assembly 6, 7. The front hinged door 2 is provided with an exterior door handle 12 operative to unlock the front hinged door 2 to the vehicle body 1 and a door mirror 13. The double hinged door assembly 100 is such that the front door 3 is opened prior to the rear hinged door 3 and the rear hinged door 3 is allowed to open only after opening the front door 3 when fully opening the continuous side aperture 14. The front hinged door 2 opens and closes the front half doorway 14a for driver. The rear hinged door 3 opens and closes the rear half doorway 14b for passengers. It is to be noted that, though the double hinged door assembly 100 of the present invention is shown, by way of example, as installed to a vehicle body having no center pillar, it may be installed to a vehicle body having a center pillar.

Figure 4:
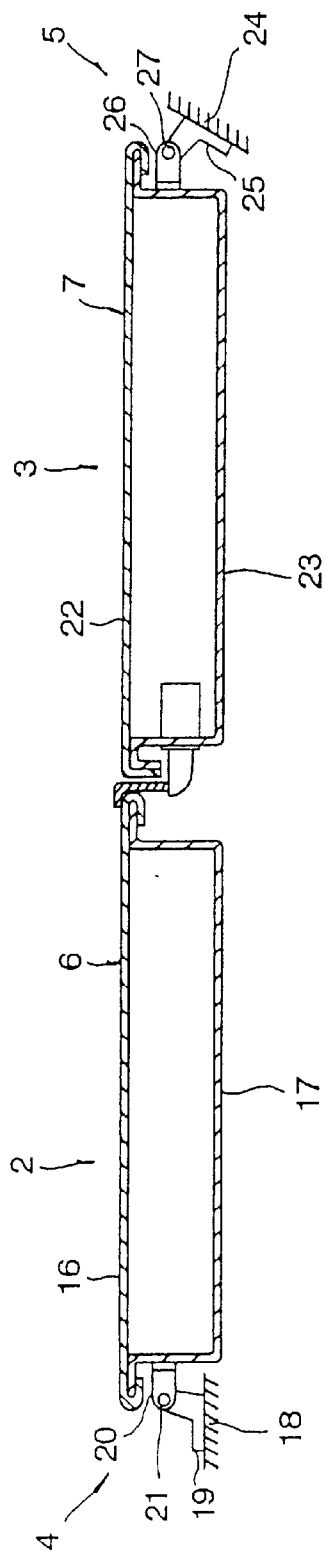
FIG. 4 is a cross-sectional view of the center-matched double hinged door assembly that is in a closed position.
Figure 5:
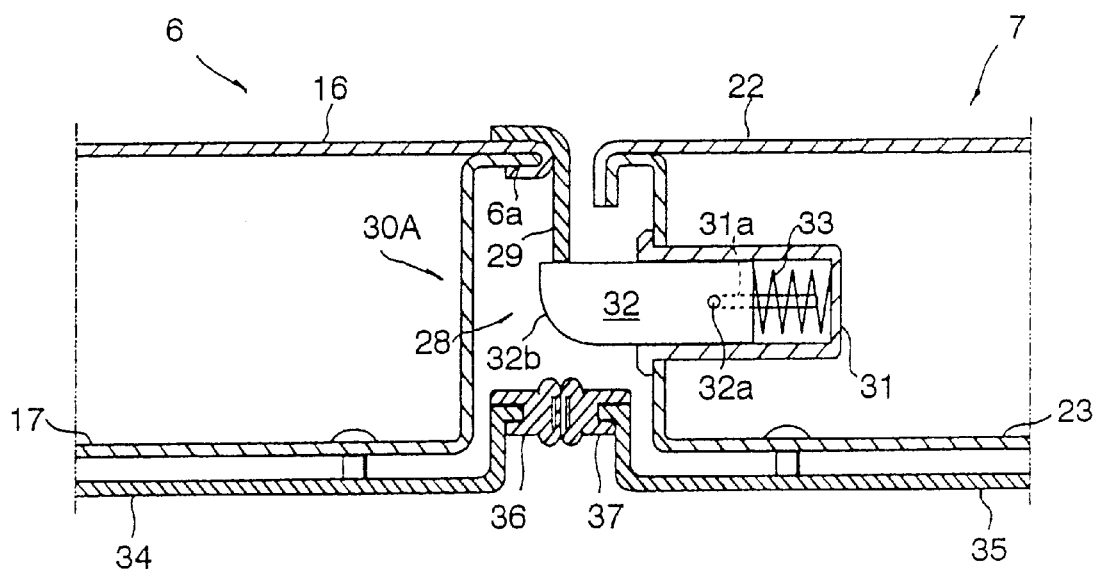
FIG. 5 is an enlarged cross-sectional view of an essential part of the center-matched double hinged door assembly.
Figure 6:
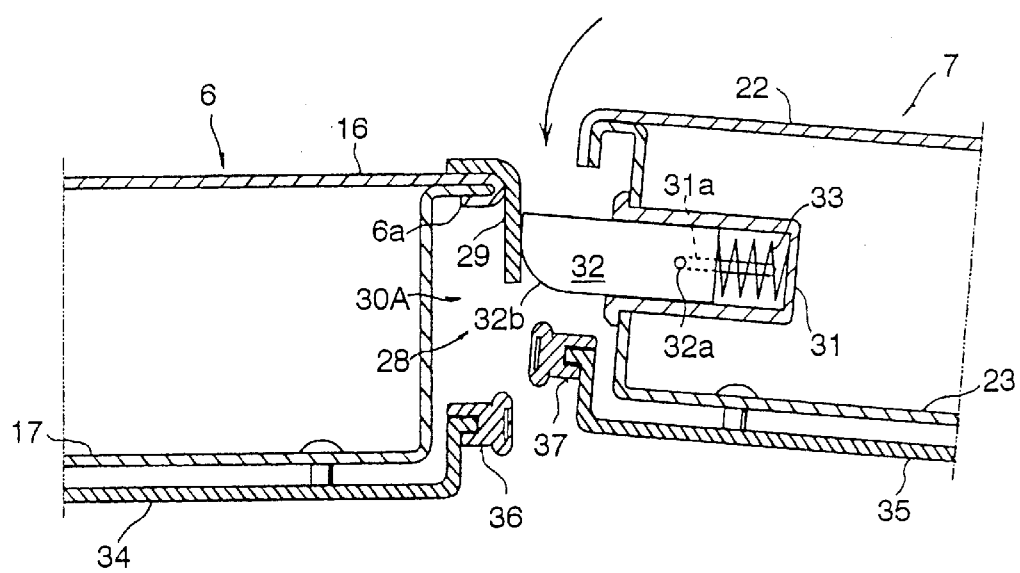
FIG. 6 is an enlarged cross-sectional view of the essential part of the center-matched double hinged door assembly in which a rear hinged door is closed following a front hinged door.

FIGS. 4 to 6 show the double hinged door assembly 100 in cross section that is in the closed position wherein the front and rear hinged doors 2 and door 3 close the front and rear half doorways 14a and 14b, i,.e. the continuous side aperture 14, respectively. As shown, the front door panel assembly 6 is made up of an outer door panel 16, an inner door panel 17 and a door trim panel 34 having a weather seal 36. The front door hinge 4 comprises a hinge plate 20 secured to the inner door panel 17, a hinge pin 21 on which the hinge plate 20 is pivotally mounted and a pivot bracket 19 that is secured to part of the vehicle body 1 such as a front pillar 18 and holds the hinge pin 21. The rear door panel assembly 7 is made up of an outer door panel 22, an inner door panel 23 and a door trim Panel 35 having a weather seal 37. The rear door hinge 5 comprises a hinge plate 26 secured to the inner door panel 23, a hinge pin 27 on which the hinge plate 26 is pivotally mounted and a pivot bracket 25 that is secured to rear part of the vehicle body 1 and holds the hinge pin 27.

As was previously mentioned, the double hinged door assembly 100 is of a center-matched type in which the rear end of the front door and the front end of the rear end face each other but not overlap each other as shown in FIGS. 5 and 6. This center-matched double hinged door assembly 100 is provided with a door lock/unlock means 30A between matched ends of the front and rear hinged door 2 and 3. The door lock/unlock means 30A comprises a latch assembly 28 and an L-shaped stopper 29 as a member for preventing the rear door from moving to the open position. As shown in detail in FIG. 5, the latch assembly 28, that is installed to the rear hinged door 3, comprises a hollow cylindrical latch slider housing 31 bolted, or otherwise secured, to the inner panel 23, a latch slider 32 received for slide movement in the latch slider housing 31 and a spring 33 received in the latch slider housing 31 retractably forcing the latch slider 32. The latch slider housing 31 is formed with a slot 31a in which a guide pin 32a knocked in the latch slider housing 31 is received for relative slide movement. The latch slider 32 at its outer end is formed with a rounded edge 32b on a side remote from the outer door panel 22 of the rear hinged door 2. The stopper 29 is welded, or otherwise secured, to a rear hemmed edge 6a of the front door assembly 6 and extends so as to butt against the latch slider 32.

In operation of the door lock/unlock means 30A, when the double hinged door assembly 100 is in a closed position, i. e. while both the front and rear doors 2 and 3 are in their closed positions as shown in FIG. 5, the stopper 29 remains stopping the latch slider 32, so that the rear hinged door 3 is prevented from moving to its open position. On the other hand, irrespective of whether the front hinged door 2 remains open or closed, the rear hinged door 3 can move to its closed position. That is, while the front hinged door 2 is in the open position, the rear hinged door 3 can move to the closed position. Further, even while the front hinged door 2 is in the closed position, the rear hinged door 3 can move to the closed position. Specifically, as shown in FIG. 6, when the rear hinged door 3 moves toward the closed position while the front hinged door 2 is in the closed position, the latch slider 32 is brought into contact with the stopper 29 and then gradually retracted into the latch slider housing 31 against the spring 33 as the rear hinged door 3 approaches the closed position. At the instant the rear hinged door 3 reaches the closed position, the latch slider 32 is released from the stopper 29 and then forced to slip under the stopper 29. As a result, the rear hinged door 3 is latched by the engagement of the latch slider 32 with the stopper 29.

That is to say, the double hinged door assembly 100 is operative in four different door opening/closing modes as shown in FIGS. 7 to 10.

Figure 7:
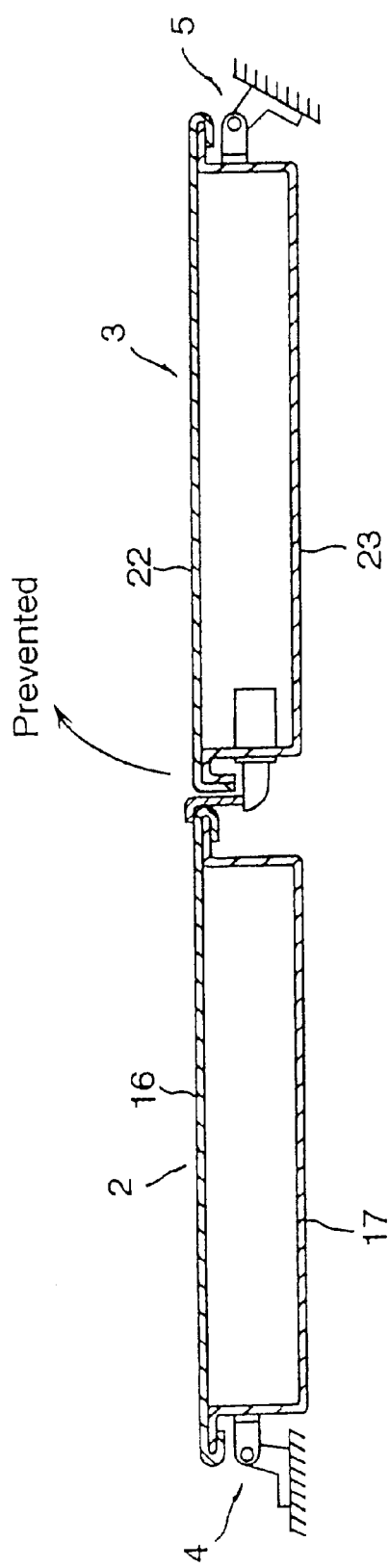
FIG. 7 is an explanatory view showing a door opening/closing mode in which the rear hinged door is prevented from opening prior to the front hinged door.
Figure 8:
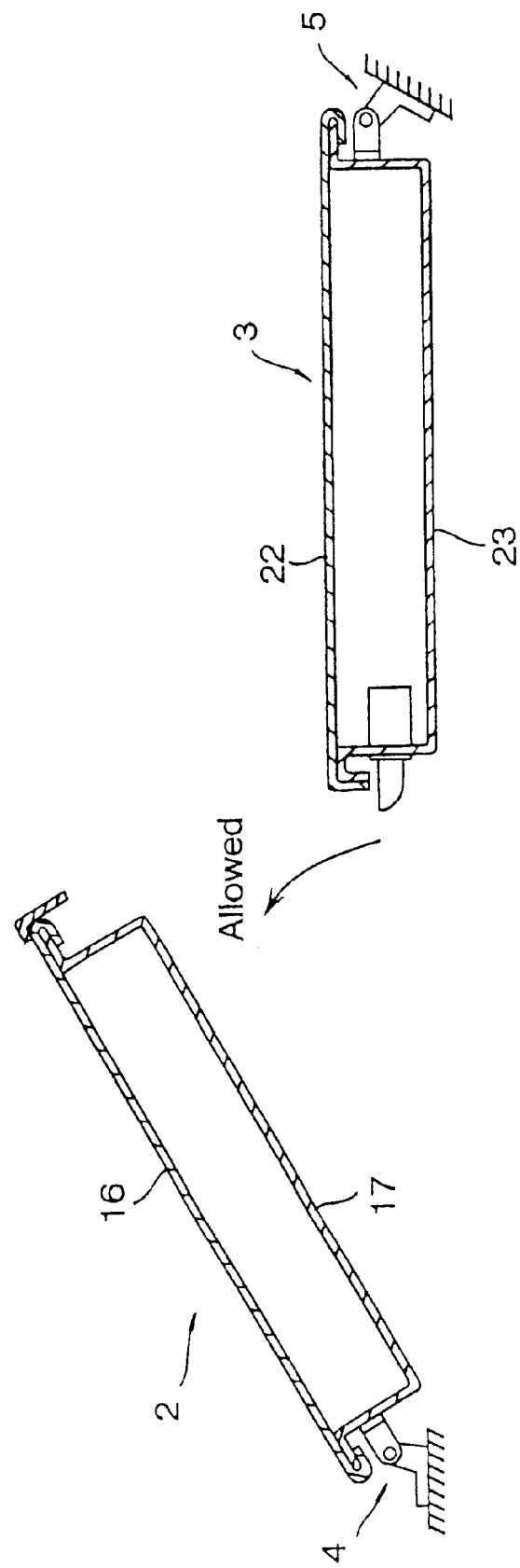
FIG. 8 is an explanatory view showing a door opening/closing mode in which the front hinged door is allowed to open prior to the rear hinged door.

As shown in FIG. 7, when the double hinged door assembly 100 is in the closed position, the rear hinged door 3 is prevented from moving, namely not allowed to move, toward the open position prior to the front hinged door 2 due to the engagement of the latch slider 32 with the stopper 29 as long as the front hinged door 2 is in the closed position. However, as shown in FIG. 8, when the front hinged door 2 can move toward the opened position so as thereby to open the front part of the continuous side aperture 14 without any constraints even while the rear hinged door 3 is in the closed position. In short, when the double hinged door assembly 100 is in the closed position, the rear hinged door 3 is prevented from moving to the open position prior to the front hinged door 2 and, on the other hand, the front hinged door 2 is always allowed to move to the open position prior to the rear hinged door 3.

Figure 9:
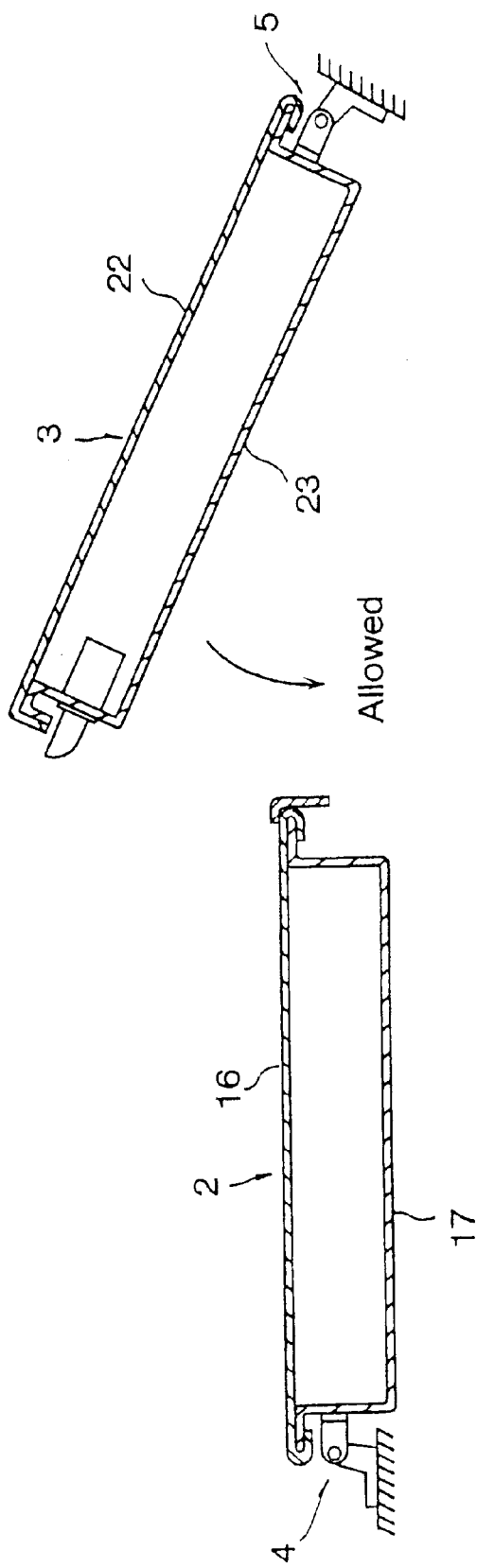
FIG. 9 is an explanatory view showing a door opening/closing mode in which the rear hinged door is allowed to close following the front hinged door.
Figure 10:
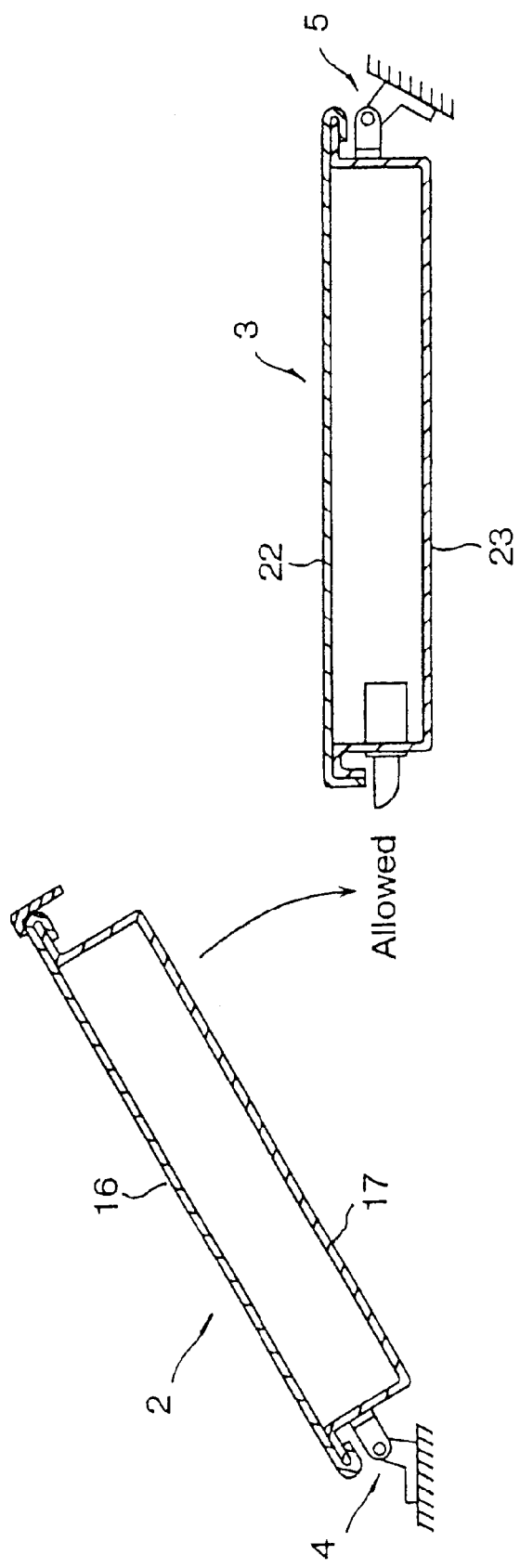
FIG. 10 is an explanatory view showing a door opening/closing mode in which the rear hinged door is allowed to close prior to the front hinged door.

When the double hinged door assembly 100 is in the open position, whichever doors 2 and 3 that are intended to close the front and rear half doorways 14a and 14b can move to the closed positions prior to the other. In more detail, as shown in FIG. 9, the rear hinged door 3 can move to the closed position so as to close the rear part of the continuous side aperture 14 even after the front hinged door 2 has moved to the closed position to close the front part of the continuous side aperture 14. In this event, as was previously described with reference to FIG. 6, when the rear hinged door 3 is moved toward the closed position, the latch lever 32 is brought into contact with the stopper 29 and then gradually retracted into the latch slider housing 31 against the spring 33 as the rear hinged door 3 approaches the closed position. When the latch slider 32 is released from the stopper 29 and then forced to slip under the stopper 29, the rear hinged door 3 reaches the closed position and is latched in the closed position by the engagement of the latch slider 32 with the stopper 29. In this way, the rear hinged door 3 can move to the closed position to close the rear part of the continuous side aperture 14 prior to the front hinged door 2. Further, as shown in FIG. 10, the front hinged door 2 can move to the closed position to close the front part of the continuous side aperture 14 without any constraints after the rear hinged door 3 has moved to the closed position.

As apparent from the above description, upon an attempt to open the continuous side aperture 14 fully or partly, the front hinged door 2 must be always opened prior to the rear hinged door 3 (front door priority opening), in other words, the rear hinged door 3 is prevented from opening while the front hinged door 2 closed. Further, upon an attempt to close the continuous side aperture 14 fully or partly when the double hinged door assembly 100 is in the open position, whichever doors 2 and 3 can be allowed to close prior to the other door without any constraints.

To sum up, the door lock/unlock means prevents the rear door from moving to the open position while the front door is in the closed position, allows the rear door to move to the open position while the front door is in the open position, and further allows the rear door to move to the closed position irrespective of the closed and open positions of the front door.

The double hinged door assembly 100 according to the above embodiment of the present invention shown in FIGS. 1 through 10 has the structure including the front hinged door 2 and the rear hinged door 3 movable in opposite directions between the closed position wherein the double hinged door assembly 100 fully opens the continuous side aperture 14 and the open position wherein the double hinged door assembly 100 fully closes the continuous side aperture 14 and the door lock/unlock means 30A arranged between the front and rear doors 2 and 3 which is operative to prevent the rear hinged door 3 from opening while the front hinged door 2 remains closed and to allow the rear hinged door 3 to open and close while the front hinged door 2 remains open. According to the double hinged door assembly 100 having the feature of front door priority opening that the rear hinged door 3 must be opened always after the front hinged door 2 has been opened even when the rear part of the continuous side aperture 14 is intended to open and can be, however, closed irrespective of the positions of the front hinged door 2, the rear hinged door 3 is reliably prevented from being opened before the vehicle stops in order, for example, to load or unload passengers and is, however, subjected to no constraints on closing. This realizes passengers' safety and improvement in the freedom of closing the double hinged door assembly 100 in addition to the convenience of opening and closing the double hinged door assembly 100.

Figure 11:
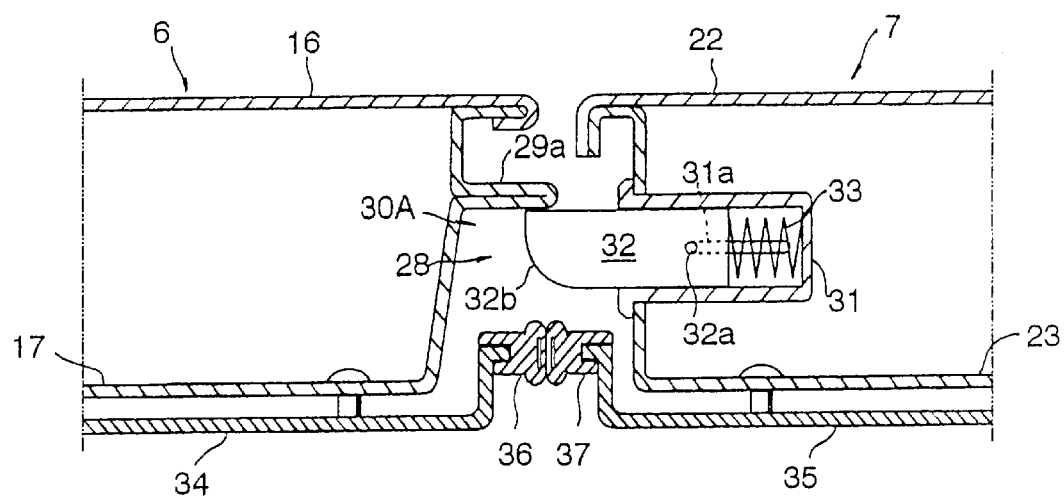
FIG. 11 is a cross-sectional view of a variant of door lock/unlock control means.

The door lock/unlock means 30A includes the latch assembly 28 that is installed to the rear hinged door 3 and comprises the round-ended latch slider 32 received in the hollow cylindrical latch slider housing 31 secured to the inner panel 23 and the spring 33 received in the latch slider housing 31 so as to retractably force the latch slider 32 and the stopper 29 that is operative to stop the latch slider 32 when the rear hinged door 3 is intended to open while the front hinged door 2 is in the closed position. The door lock/unlock means 30A is simple in mechanical structure and has no necessity of electric power and electrical control, FIG. 11 shows a variant of the door lock/unlock means 30A including a stopper as a member for preventing the rear door from moving to the open position that is different from the stopper 29 shown in FIGS. 5 and 6. The front hinged door 2 is formed with a tongue-shaped stopper 29a that is different in shape from the stopper 29 but is the same in operation as the stopper 29. The stopper 29a is an integral part of an inner door panel 17 of a front hinged door 2. This variant of the door lock/unlock means 30A is advantageous to a reduction in the number of parts and the number of man-hour for assembling the door lock/unlock means 30A.

Figure 12:
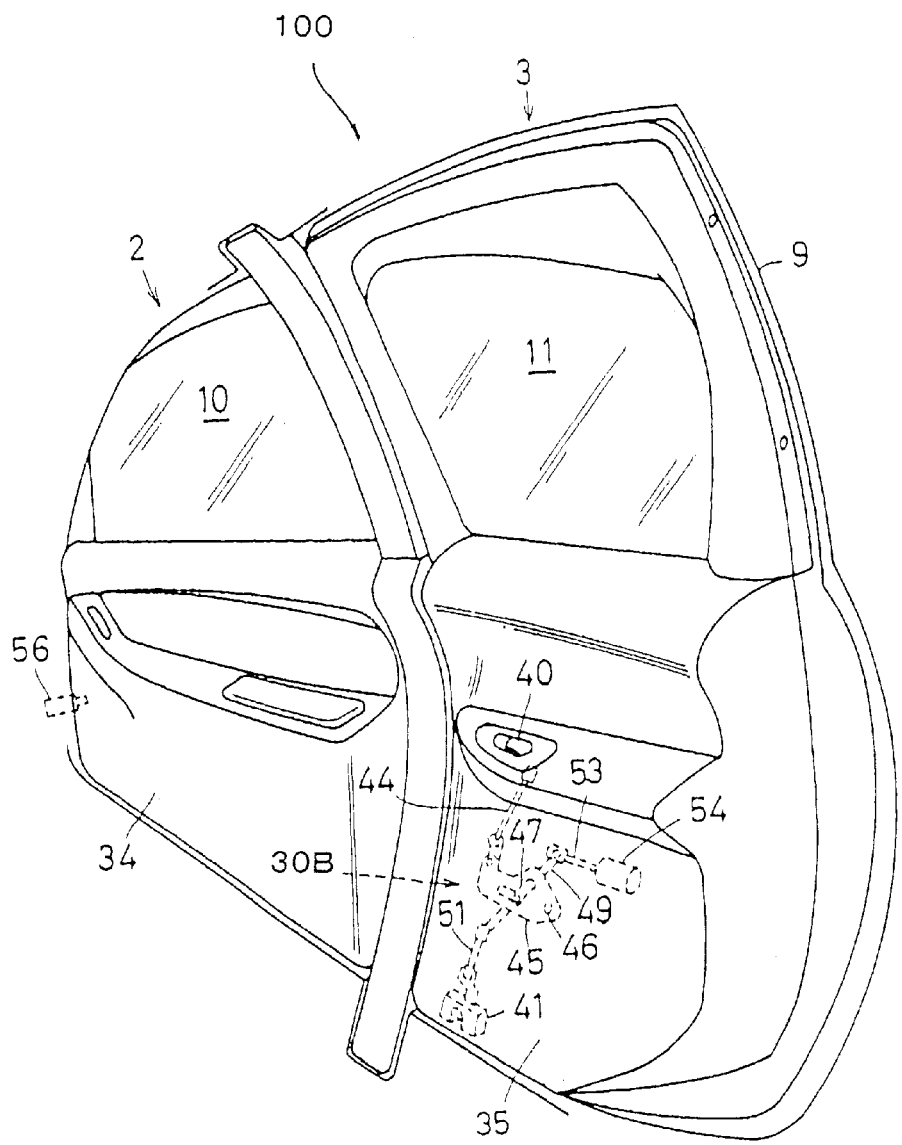
FIG. 12 is a perspective view of a center-matched double hinged door assembly according to another embodiment of the present invention.
Figure 13:
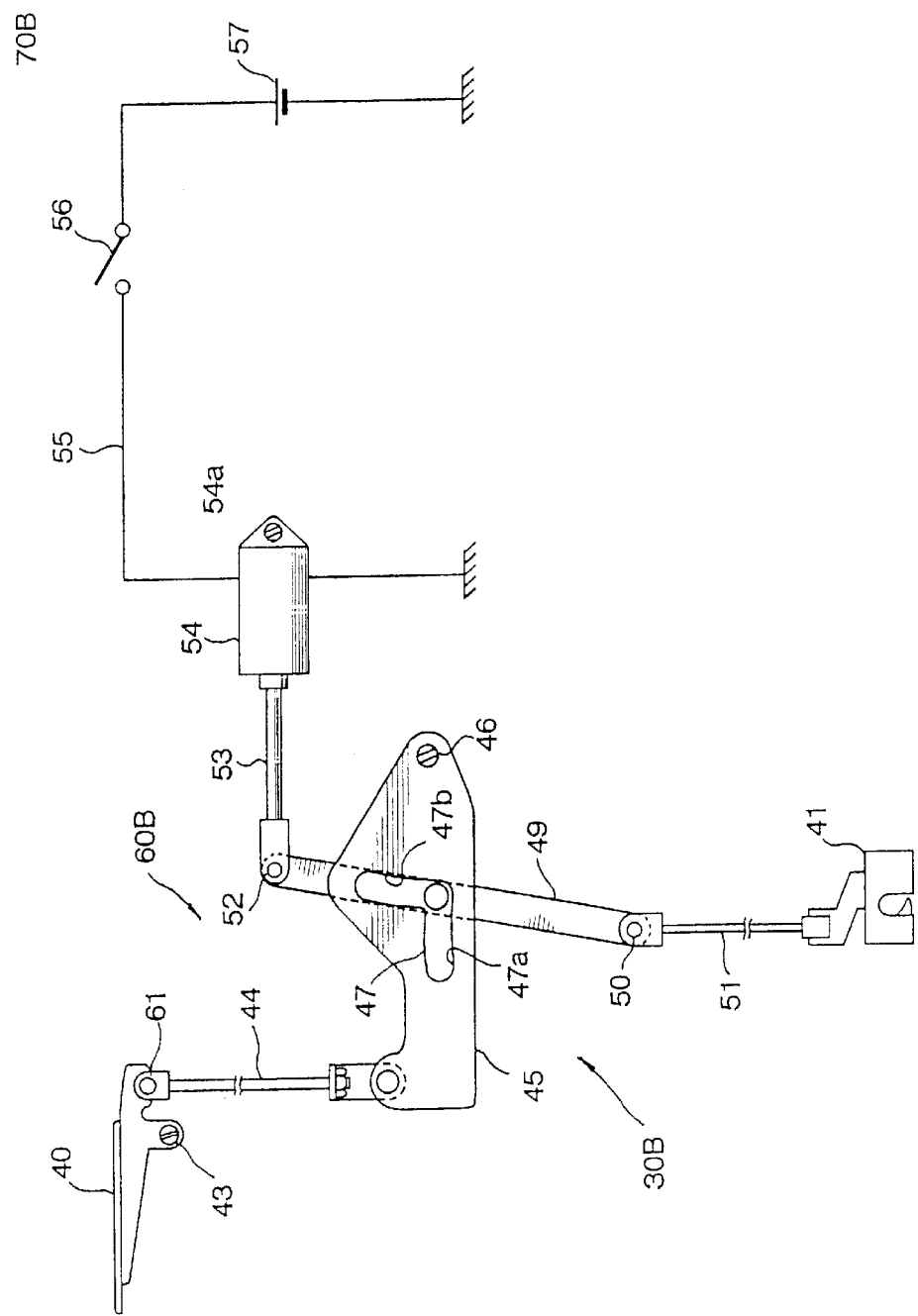
FIG. 13 is an explanatory view of door lock/unlock means including a coupling/uncoupling mechanism when uncoupling a rear door handle from a door lock unit.
Figure 14:
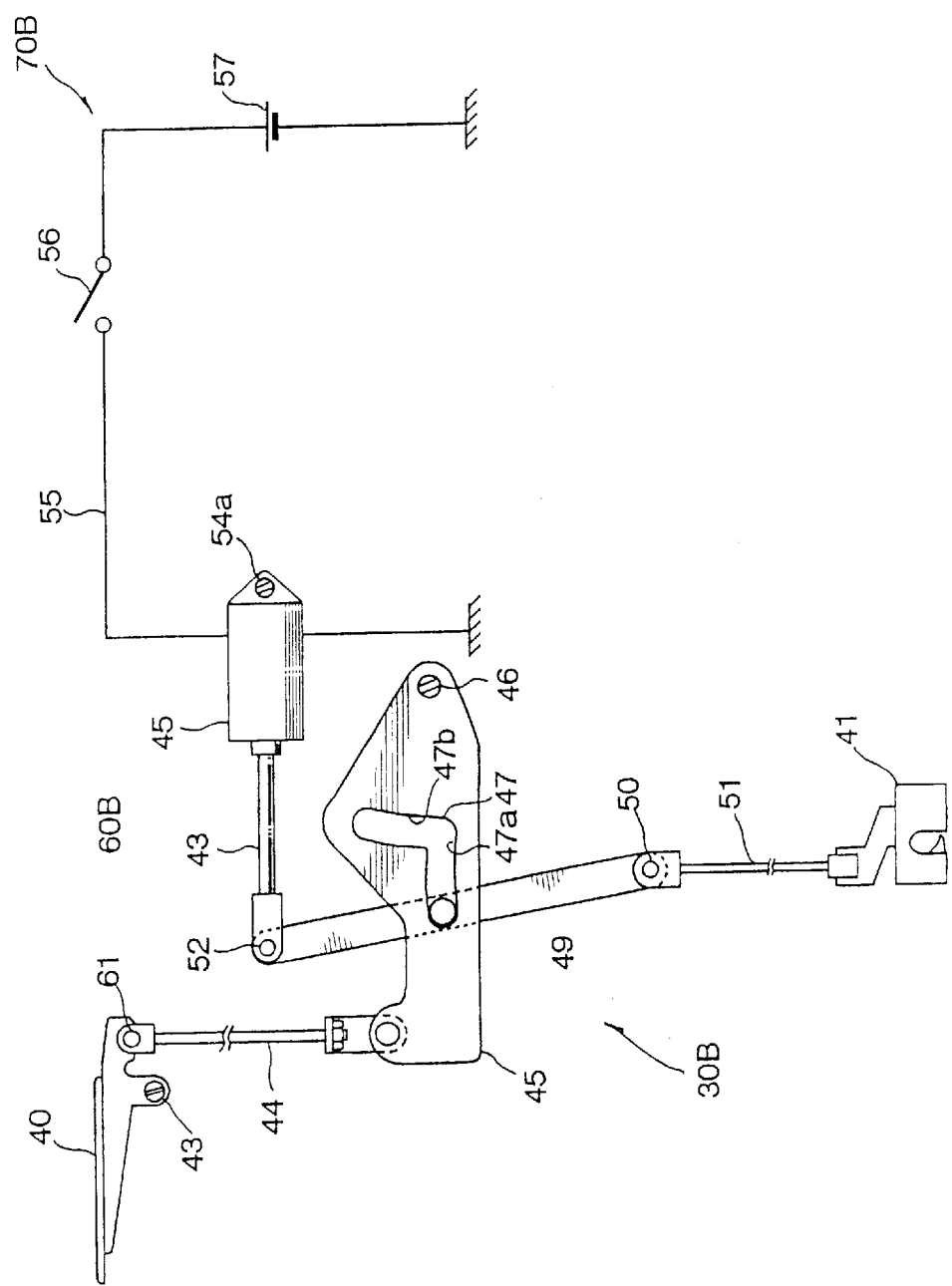
FIG. 14 is an explanatory view of the door lock/unlock means when coupling the rear door handle to the door lock unit.

FIGS. 12 through 14 show a center-matched double hinged door assembly 100 according to another embodiment of the present invention. The double hinged door assembly 100 comprises front and rear hinged doors 2 and 3 which are the same in structure as those of the previous embodiment and door lock/unlock control means 30B mainly installed in the interior of the rear hinged door 3. The door lock/unlock means 30B, which cooperates with a door switch 56, operationally couples a rear door handle 40 installed to the door trim panel 34 of the rear hinged door 3 to a door lock unit 41 together and operationally uncouples the rear door handle 40 from the door lock unit 41. The door lock/unlock means 30B comprises an interlocking mechanism such as a coupling/uncoupling mechanism 60B cooperative with the door switch 56. The door lock unit 41 locks the rear hinged door 3 to the vehicle body 1 when the rear hinged door 3 is closed and is caused to release or unlock the rear hinged door 3 from the vehicle body 1 when the rear door handle 40 is operated. The coupling/uncoupling mechanism 60B has two operating positions, namely an uncoupling position as shown in FIG. 13 wherein it brings the operationally uncoupling the rear door handle 40 from the door lock unit 41 and a coupling position as shown in FIG. 14 wherein it brings the door lock/unlock means 30B operationally coupling the rear door handle 40 to the door lock unit 41 together. The door switch 56 remains opened while the front hinged door 2 is in the closed position and remains closed while the front hinged door 2 is in the open position. The door lock unit 41 is known in various forms in the art and may take any well known form. Further, the door switch 56 may be replaced with sensors such as a photo-sensor operative to detect the front door 3 in the closed position. For example, the photo-sensor may comprise a light emitting element and a photo-sensitive element disposed on opposite sides of a slot of a door check swivel which operates to exert friction on the front hinged door 2 during opening and closing. Further, the door switch 56 may be replaced with an on/off relay well known in the art.

When the rear door handle 40 is pulled up while the coupling/uncoupling mechanism 60B is in the coupling position, the door lock unit 41 is caused to unlock the rear hinged door 3 from the vehicle body 1. However, even when the rear door handle 40 is pulled up while the coupling/uncoupling mechanism 60B is in the uncoupling position, the door lock unit 41 stands still, so that the rear hinged door 3 remains locked to the vehicle body 1.

Specifically, the rear door handle 40 is pivotally mounted on a pivot 43 fixed to an inner door panel of a rear door panel assembly (not shown) to swivel up and down. The coupling/uncoupling mechanism 60B comprises a swivel arm 45, a selector lever 49 and an actuator solenoid 54 with a reciprocal plunger 53. The swivel arm 45 is pivotally mounted at one of opposite ends on a pivot 46 fixed to the inner door panel of the rear door panel assembly and is connected at another end to the rear door handle 40 through a connecting rod 44. The swivel arm 45 is formed with a continuous guide slot 47 comprising a horizontally extending section (horizontal slot) 47a and a vertically extending section (vertical slot) 47b. The selector lever 49, that extends substantially vertically, has an upper end connected to a pivot 52 fixed to a head of the plunger 53 that is received for slide movement in the actuator solenoid 54 and a lower end provided with a pivot 50 to which a connecting rod 51 extending from the door lock unit 41 is connected. The selector lever 49 is provided with a guide pin 48 received in the continuous guide slot 47. The horizontal slot 47a has an arcuate configuration as a part of a circle with center at the pivot 50. The vertical slot 47b has an arcuate configuration as a part of a circle with center at the pivot 46. The actuator solenoid 54 is pivotally mounted at an end 54a and is controlled in operation by a control circuit 70B including the door switch 56 connected between the actuator solenoid 54 and a battery 57 by a power line 55.

In operation of the coupling/uncoupling mechanism 60B, while the guide pin 48 is in the horizontal slot 47a, clockwise movement of the rear door handle 40 is transmitted to the swivel arm 45 as counterclockwise movement about the pivot 46 through the connecting rod 44 and then to the latch lever 49 as vertically downward movement through pin-slot engagement between the horizontal slot 47a of the swivel arm 45 and the guide pin 48 of the selector lever 49. This causes the door lock unit 41 to unlock the rear hinged door 3 from the vehicle body 1. On the other hand, while the guide pin 48 is at a bottom of the vertical slot 47b, although upward movement of the rear door handle 40 is transmitted to the swivel arm 45 as counterclockwise movement about the pivot 46 through the connecting rod 44, there is no transmission of the counterclockwise movement of the swivel arm 45 to the selector lever 49 due to relative movement of the guide pin 48 in the vertical slot 47b, in other words, the swivel arm 45 is uncoupled from the selector lever 49, so that the swivel arm 45 idles. As a result, the door lock unit 41 remains locking the rear hinged door 3 to the vehicle body 1 even when the rear door handle 40 is pulled up.

The actuator solenoid 54 remains deenergized while the door switch 56 is open, i.e. while the front hinged door 2 is in the closed position, the plunger 53 remains pulled in the actuator solenoid 54 as shown in FIG. 13. As a result, the selector lever 49 keeps the guide pin 48 at the bottom of the vertical slot 47b. In this event, the locking/unlocking mechanism 60B is put in the uncoupling position, so as thereby to bring the door lock/unlock means 30B operationally uncoupling the rear door handle 40 from the door lock unit 41. That is, while the front hinged door 2 is in the closed position, even when the rear door handle 40 is swiveled up with an intention to open the rear hinged door 3, the rear hinged door 3 is prevented from being unlocked. In consequence, the rear door can not be moved to the open position. On the other hand, the actuator solenoid 54 remains energized while the door switch 56 remains closed, i.e. while the front hinged door 2 is in the open position, the plunger 53 remains protruded out as shown in FIG. 14. As a result, the selector lever 49 keeps the guide pin 48 in the horizontal slot 47a. In this event, the coupling/uncoupling mechanism 60B is put in the coupling position, so as thereby to bring the door lock/unlock means 30B operationally coupling the rear door handle 40 to the door lock unit 41 together. Specifically, while the door switch 56 remains closed, when the rear door handle 40 is swiveled up with an intention to open the rear hinged door 3, the swivel arm 45 swivels down in the counterclockwise direction, so as to force the selector lever 49 downward, thereby causing the door lock unit 41 to unlock the rear hinged door 3 from the vehicle body 1. That is, when the front hinged door 2 is in the open position, the rear hinged door 3 is unlocked from the vehicle body 1 whenever the rear door handle 40 is swiveled up, so that the rear door 3 can be moved to the open position to open the rear part of the continuous side aperture 14.

As described above in detail, the door lock/unlock means 30B including the locking/unlocking mechanism 60B prevents the rear hinged door 3 from moving to the open position while the front hinged door 2 is in the closed position and allows it to move to the open position while the front hinged door 2 is in-the open position. In addition, when the front hinged door 2 is moved to the closed position from the open position, this is detected by the door switch 56, then the door lock/unlock means 30B brings the coupling/uncoupling mechanism 60B operationally uncoupling the rear door handle 40 from the door lock unit 41. As a result, the rear door 3 remaining closed is in any way prevented from moving to the open position. On the other hand, when the front hinged door 2 is moved to the open position from the closed position, this is detected by the door switch 56, then the door lock/unlock means 30B brings the coupling/uncoupling mechanism 60B operationally coupling the rear door handle 40 to the door lock unit 41 together. As a result, the rear hinged door 3 is allowed to move in opposite ways to the open and closed positions. Accordingly, the double hinged door assembly 100 of this embodiment can operate in any possible door opening/closing modes as shown in FIGS. 7 through 10.

In the double hinged door assembly, the door lock/unlock means 30B prevents the rear door from moving to the open position while the front door is in the closed position, allows the rear door to move to the open position while the front door is in the open position and further allows the rear door to move to the closed position irrespective of the closed and open positions of the front door. That is, the door lock/unlock means 30B makes operation of the rear door handle 40 operationally ineffective while the front door 3 is in the closed position, so that the rear door 3 is kept locked to the vehicle body 1 even when the rear door handle 40 is operated. Since the coupling/uncoupling mechanism has no necessity of coercively stopping a release member or the like, the lock/unlock means 30B can have improved durability.

Figure 15:
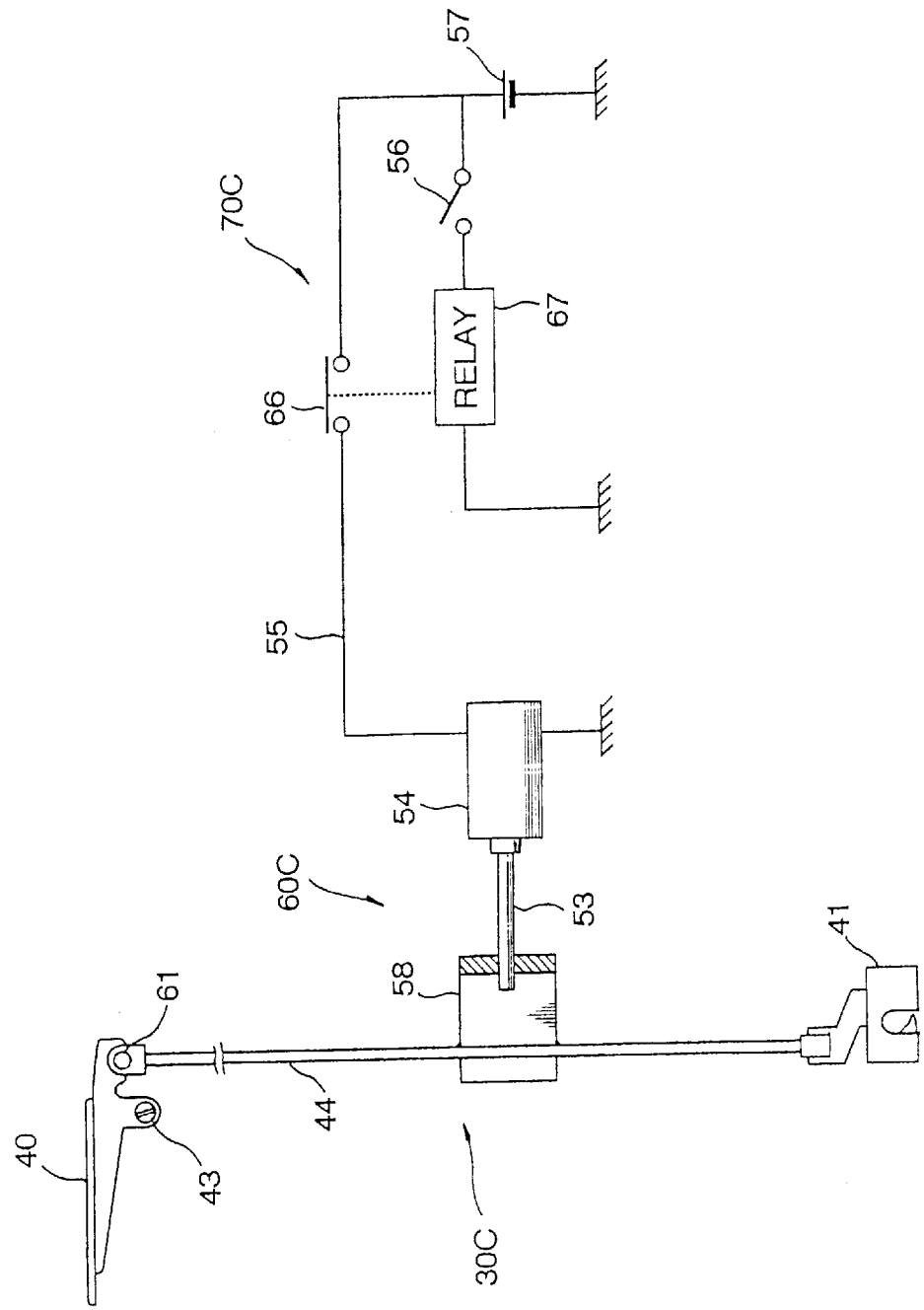
FIG. 15 is an explanatory view of door lock/unlock means including a locking mechanism when disconnecting operation of the rear door handle to the door lock unit.
Figure 16:
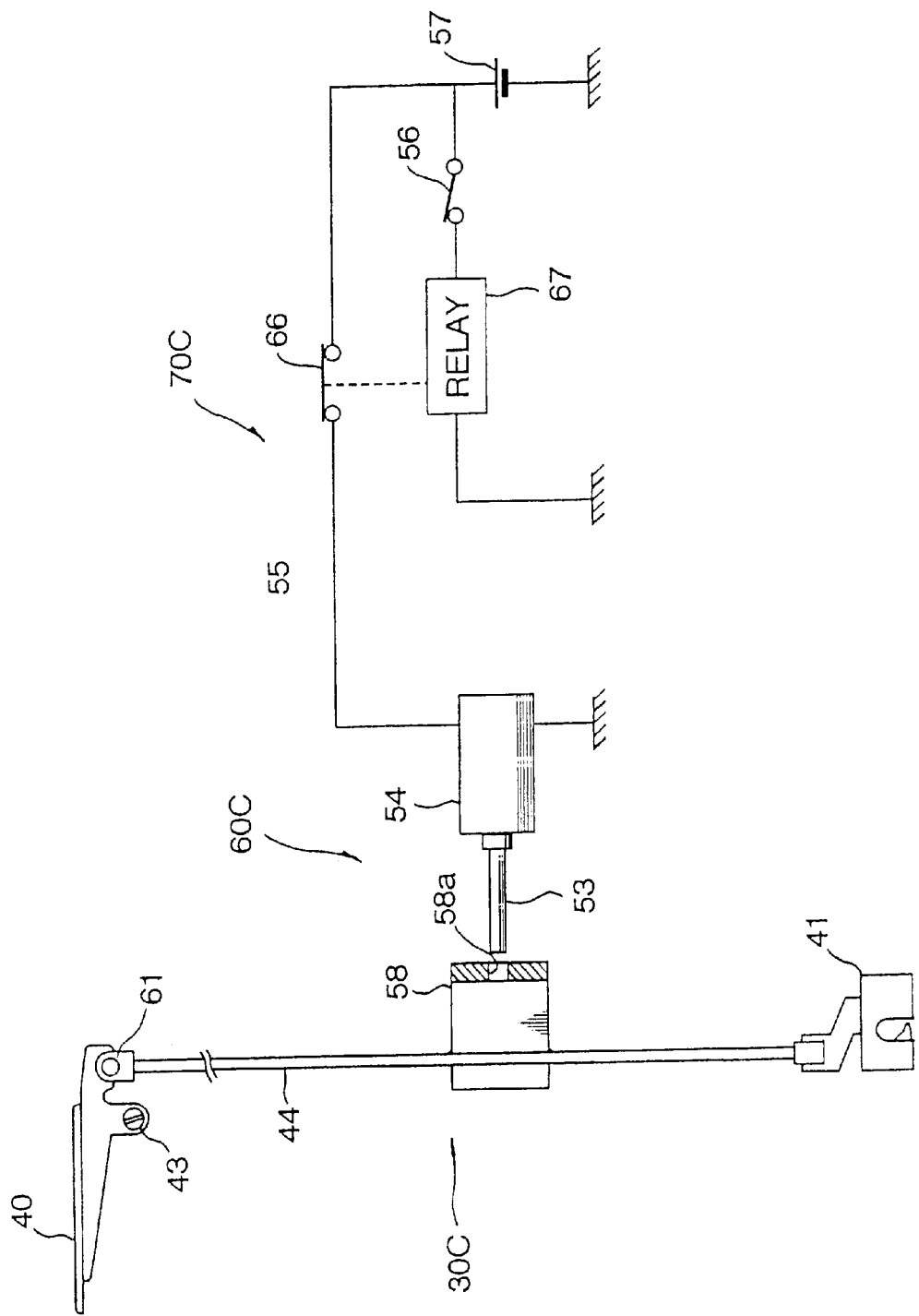
FIG. 16 is an explanatory view of the door lock/unlock means when connecting operation of the rear door handle to the door lock unit.

FIGS. 15 and 16 show a variant of the door lock/unlock means 30B of the double hinged door assembly 100 shown in FIGS. 12 through 14. A lock/unlock means 30C mainly installed in the inside of the rear hinged door 3 connects operation, namely swivel movement, of a rear door handle 40 installed to the door trim panel 34 of the rear hinged door 3 to a door lock unit 41 operative to lock the rear hinged door 3 to the vehicle body 1 and to unlock the rear hinged door 3 from the vehicle body 1. The rear door handle 40 is pivotally mounted on a pivot 43 fixed to an inner door panel of a rear door panel assembly (not shown) so as to swivel up and down.

The door lock/unlock means 30C comprises an interlocking mechanism comprising a connecting rod 44, an interlocking mechanism such as a lock mechanism 60C including a control circuit 70C and a front door switch 56. The connecting rod 44 has an upper end mounted on a pivot 61 fixed to the rear door handle 40 and a lower end fixedly mounted to the door lock unit 41. The door switch 56 is kept open by the front hinged door 2 in its closed position and is kept closed while the front hinged door 2 is in its open position. The lock mechanism 60C comprises a striker 58, an actuator solenoid 54 with a plunger 53. The actuator solenoid 54 is fixedly installed to the rear hinged door 3 and connected to the control circuit 70C. The striker 58, which is welded, or otherwise secured, to the connecting rod 44, is formed with a striker opening 58a for receiving the plunger 63. The plunger 53 is received for slide movement in the actuator solenoid 54. The control circuit 70C includes a battery 57 connected to the actuator solenoid 64 via a normally-open relay switch 66 through a power line 55 and a relay 67 which is connected in parallel with the relay switch 66 to the battery 57 via the door switch 56.

The control circuit 70C controls the actuator solenoid 54. The relay 67 remains turned off to bring the relay switch 66 opening when the door switch 56 opens as shown in FIG. 15, i.e. when the front door 2 is in the closed position, so as to keep the actuator solenoid 54 deenergized. The relay 67 turns on to bring the relay switch 66 closing when the door switch 56 closes as shown in FIG. 16, i.e. when the front door 2 is in the open position, so as to energize the actuator solenoid 54. While the actuator solenoid 54 remains deenergized, the plunger 53 remains pushed out and received in the striker opening 58a of the striker 58. On the other hand, when the actuator solenoid 54 is energized, the plunger 53 is forced into the actuator solenoid 53 and comes out of the striker opening 58a of the striker 58.

In the closed position of the front hinged door 2 of the double hinged door assembly 100G, the front door switch 56 and the relay switch 66 remain open, so that the actuator solenoid 54 remains deenergized leaving the plunger 53 pushed out and received in the striker opening 58a of the striker 58. In consequence, the lock mechanism 60C locks the connecting rod 44, 50 that the door lock/unlock means 30C is put immobile, or prevented from moving up and down, to prevent the rear door handle 40 from being swiveled up. That is, while the front hinged door 2 remains closed, the rear door handle 40 is kept inoperative. On the other hand, in the open position of the front hinged door 2 of the double hinged door assembly 100, the front door switch 56 and the relay switch 66 remain closed, so that the actuator solenoid 54 remains energized leaving the plunger 53 pulled in the striker opening 58a of the striker 58. In consequence, the lock mechanism 60C unlocks the connecting rod 44, so that the door lock/unlock means 30C is put mobile, or allowed to move up and down, to allow the rear door handle 40 to swivel up. That is, while the front hinged door 2 remains open, the rear door handle 40 is kept operative. Accordingly, the variant of the double hinged door assembly 100 described above operates in any possible door opening/closing modes as shown in FIGS. 7 through 10.

The lock mechanism 60C is simple in its own structure, so that the door lock/unlock means 30C can be simplified in structure and is reliable in operation.

Figure 17:
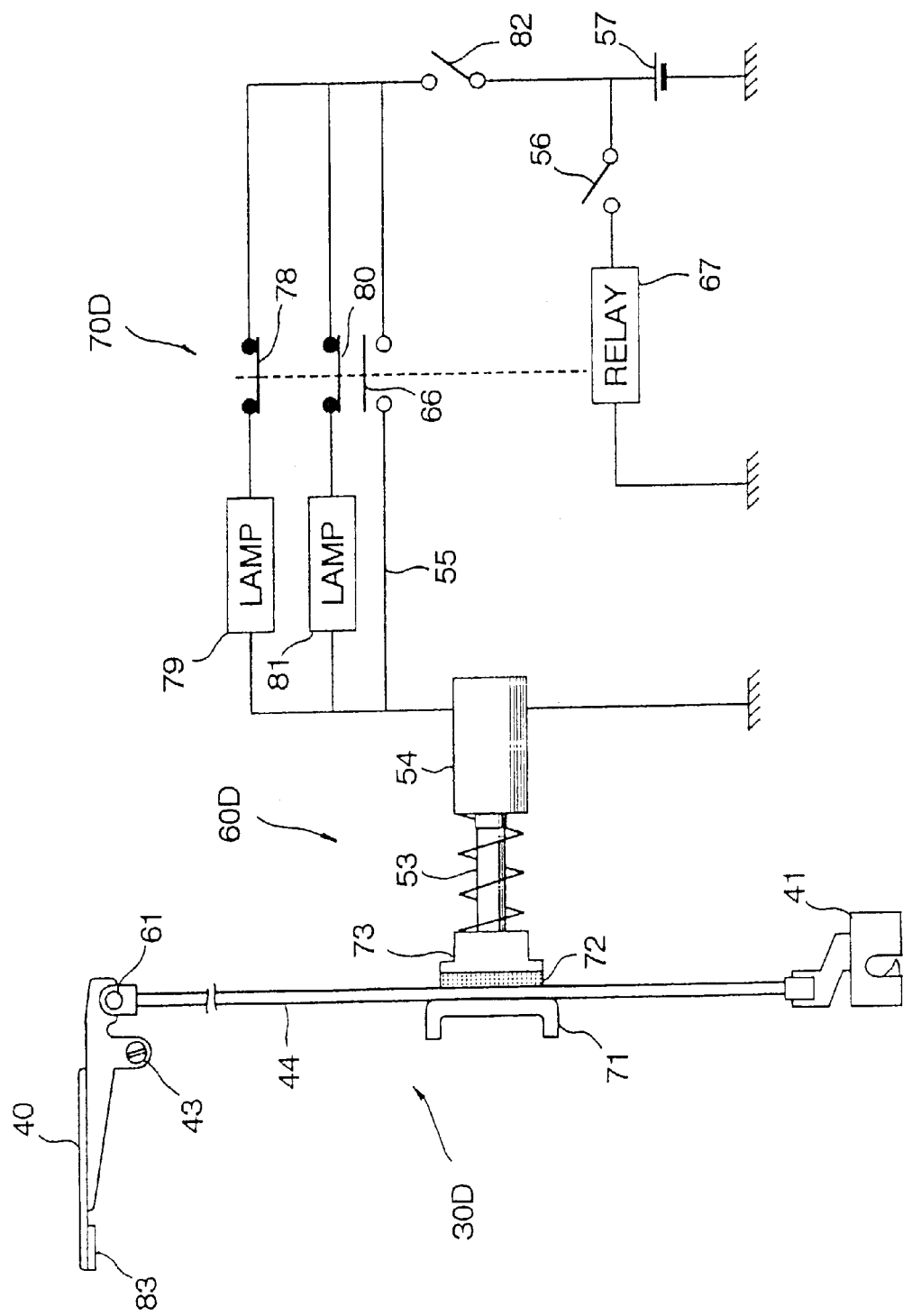
FIG. 17 is an explanatory view of door lock/unlock means including a braking mechanism when disconnecting operation of the rear door handle to the door lock unit.
Figure 18:
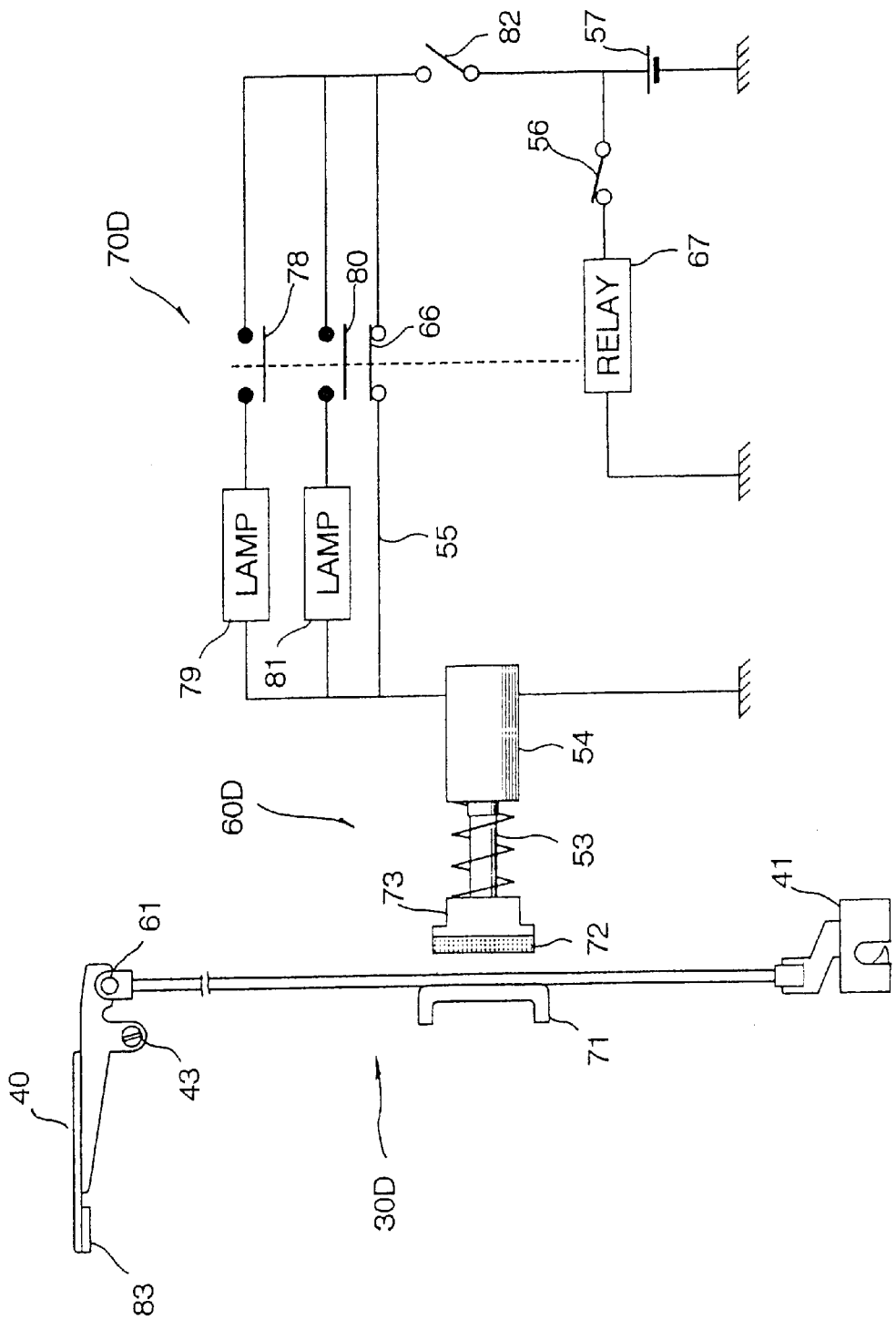
FIG. 18 is an explanatory view of the door lock/unlock means when connecting operation of the rear door handle to the door lock unit.

FIGS. 17 and 18 show another variant of the door lock/unlock means 30B of the double hinged door assembly 100 shown in FIGS. 12 through 14. A door lock/unlock means 30D mainly installed in the interior of the rear hinged door 3 connects operation, namely swivel movement, of a rear door handle 40 to a door lock unit 41. The rear door handle 40 is installed to the door trim panel 34 of the rear hinged door 3 and is pivotally mounted on a pivot 43 fixed to an inner door panel of a rear door panel assembly (not shown) so as to swivel up and down. The door lock unit 41 is operative to lock the rear hinged door 3 to the vehicle body I and to unlock the rear hinged door 3 from the vehicle body 1.

The door lock/unlock means 30D comprises a connecting rod 44, an interlocking mechanism such as an arresting or braking mechanism 60D including a control circuit 70D and a door switch 56. The connecting rod 44 has an upper end mounted on a pivot 61 fixed to the rear door handle 40 and a lower end fixed to the door lock unit 41. The door switch 56 is kept open by the front hinged door 2 in its closed position and is kept closed while the front hinged door 2 is in the open position. The braking mechanism 60D comprises a backup plate 71, an actuator solenoid 54 with a spring loaded plunger 53, and a control circuit 70D. The backup plate 71 is fixedly disposed in the interior of the rear hinged door 3 so as to support the connecting rod 44. The actuator solenoid 54 is fixedly installed to the rear hinged door 3 and connected to the control circuit 70D. The spring loaded plunger 53 is received for slide movement in the actuator solenoid 54 and is provided at its extreme end with a braking head 73 having a friction pad 73 secured thereto. While the actuator solenoid 54 remains deenergized, the spring loaded plunger 53 is pulled out of the actuator plunger 54 to force the braking head 73 against the connecting rod 44 so as to frictionally brake the connecting rod 44. As a result, the connecting rod 44 is put immobile, or prevented from moving up and down, as shown in FIG. 17. On the other hand, while the actuator solenoid 54 remains energized, the spring loaded plunger 53 remains pulled in the actuator plunger 54 to separated the braking head 73 away from the connecting rod 44. As a result, the connecting rod 44 is put mobile, or allowed to move up and down as shown in FIG. 18.

The control circuit 70D comprises a battery 57 connected to the actuator solenoid 54 via a normally-open relay switch 66 through a power line 65 and a relay 67 connected to the battery 57 in parallel with the relay switch 66 via the door switch 56. While the front door switch 56 remains open, the relay 67 remains turned off so as to keep the relay switch 66 open (FIG. 17). On the other hand, while the front door switch 56 remains closed, the relay 67 is turned on so as to keep the relay switch 66 closed (FIG. 18). The control circuit 70D further comprises visible warning means comprising a normally-closed relay switch 78 and a warning lamp 79 connected in series to the battery the battery 57 via a warning switch 82 and audio warning means comprising a normally-closed relay switch 80 and an alarm 81 connected in series to the battery 57 via a door handle switch 82. These visible and audio warning means are in parallel with each other and with the relay switch 66. The door handle switch 82 is such as to be closed only when a pressure-sensitive sensor 83 attached to the under side of the rear door handle 40 is touched by a passenger. The lamp 79 is desirably disposed near the rear door handle 40. The alarm 81 may be disposed anywhere in the passenger compartment as far as sounds from the alarm 81 is audible to passengers sitting on a rear passenger seat.

In operation of the door lock/unlock means 30D, while the front hinged door 2 is in the closed position, the door switch 56 remains open, so as to keep the relay 67 turned off. As a result, the relay switch 66 remains open and the relay switches 78 and 80 remain closed, so that the actuator solenoid 54 remains deenergized. In consequence, the spring loaded plunger 53 forces the braking head 73 against the connecting rod 44 so as thereby to prevent it from moving up and down. That is, while the front hinged door 2 remains closed, the rear door handle 40 is inoperative, so that the rear hinged door 3 is prevented from opening. In this event, when the rear door handle 40, in particular the pressure-sensitive sensor 83, is touched by a passenger with an intention to open the rear hinged door 3, the warning switch 82 is closed. In consequence, the warning lamp 79 is actuated to turn on or flush on and off t and the alarm 81 is actuated to make warning sounds. This provides the passenger on the rear passenger seat with the warning that the rear hinged door 3 is restrained from opening prior to the front hinged door 2.

On the other hand, while the front hinged door 2 remains open, the door switch 56 remains closed, so as to keep the relay 67 turned on, thereby keeping the relay switch 66 closed and the relay switches 78 and 80 open. As a result, the actuator solenoid 54 remains energized to pull the spring loaded plunger 53 therein, so as thereby to put the connecting rod 44 mobile, or to allow it to move up and down. That is, while the front hinged door 2 remains open, the rear door handle 40 is mobile, i.e. allowed to move up and down, so that the rear hinged door 3 can be opened. In this event, when the rear door handle 40, in particular the pressure-sensitive sensor 83, is touched by a passenger with an intention to open the rear hinged door 3, although the warning switch 82 is closed, the warning lamp 79 and the alarm 81 are not actuated because the relay switches 78 and 80 remain open. Accordingly, the double hinged door assembly 100 of this embodiment can operate in any possible door opening/closing modes as shown in FIGS. 7 through 10.

The braking mechanism 60D, and hence the door lock/unlock means 30D, presents significant improvement with regard to structural durability and operational reliability, The present invention has been described with reference to preferred embodiments thereof. However, it will be appreciated that variants and other embodiments can be effected by persons of ordinary skill in the art without departing from the scope of the invention.

What is claimed is:

1. A center-matched double hinged door assembly for a vehicle body having a continuous aperture as a doorway formed at each of opposite sides of the vehicle body, said double hinged door assembly being movable between a closed position wherein the double hinged door assembly fully closes the continuous aperture and an open position wherein the double hinged door assembly fully opens the continuous aperture, said double hinged door assembly comprising:

a front door adapted to be hinged at a front end of said front door to the vehicle body, said front door is movable between said closed position wherein said front door closes a front part of the continuous aperture and said open position wherein said front door opens said front part of the continuous aperture;

a rear door adapted to be hinged at a rear end of said rear door to the vehicle body, said rear door is movable between said closed position wherein said rear door closes a rear part of the continuous aperture and said open position wherein said rear door opens said rear part of the continuous aperture; and door lock means incorporated in said double hinged door assembly for preventing said rear door from moving to said open position while said front door is in said closed position, allowing said rear door to move to said open position while said front door is in said open position and allowing said rear door to move to said closed position irrespective of said closed and open positions of said front door.

2. The center-matched double hinged door assembly as defined in claim 1, wherein said door lock means further comprises door position detection means for detecting said front door in said closed and open positions, and said door lock means allowing said rear door to move to said open position while said door position detection means detects said front door in said open position and preventing said rear door from moving to said open position while said door position detection means detects said front door in said closed position.

3. The center-matched double hinged door assembly as defined in claim 2, wherein said door lock means comprises a rear door handle installed to said rear door and operative to unlock said rear door, a door lock unit operative to lock said rear door to said vehicle body when said rear door moves to said closed position and to keep said rear door locked to said vehicle body until said rear door handle is operated, and an interlocking mechanism disposed in said rear door and operationally coupling said rear door handle to said door lock unit together to connect operation of said rear door handle to said door lock unit so as thereby to allow said door look unit to unlock said rear door on said vehicle body upon said operation of said rear door handle while said door position detection means detects said front door in said open position and operationally uncoupling said rear door handle from said door lock unit to disconnect said operation of said rear door handle so as thereby to prevent to said door lock unit from unlocking said rear door from said vehicle door irrespective of said operation of said rear door handle while said door position detection means detects said front door in said closed position.

4. The center-matched double hinged door assembly as defined in claim 2, wherein said door lock means comprises a rear door handle installed to said rear door and operative to unlock said rear door, a door lock unit operative to lock said rear door to said vehicle body when said rear door moves to said closed position and to keep said rear door locked to said vehicle body until said rear door handle is operated, and an interlocking mechanism disposed in said rear door and mechanically connecting operation of said rear door handle to said door lock unit so as to unlock said rear door from said vehicle body upon said operation of said rear door handle, said interlocking mechanism being mechanically locked to prevent said operation of said rear door handle so as thereby to prevent said door lock unit from unlocking said rear door from said vehicle body while said door position detection means detects said front door in said closed position and being unlocked to allow said operation of said rear door handle so as thereby to unlock said rear door from said vehicle body upon said operation of said rear door handle while said door position detection means detects said front door in said open position.

5. The center-matched double hinged door assembly as defined in claim 2, wherein said door lock means comprises a rear door handle installed to said rear door and operative to unlock said rear door, a door lock unit operative to lock said rear door to said vehicle body when said rear door moves to said closed position and to keep said rear door locked to said vehicle body until said rear door handle is operated, and an interlocking mechanism disposed in said rear door and mechanically connecting operation of said rear door handle to said door lock unit so as to unlock said rear door from said vehicle body upon said operation of said rear door handle, said interlocking mechanism being frictionally braked to prevent said operation of said rear door handle so as thereby to prevent said door lock unit from unlocking said rear door from said vehicle body while said door position detection means detects said front door in said closed position and being released to allow said operation of said rear door handle so as thereby to unlock said rear door from said vehicle body upon said operation of said rear door handle while said door position detection means detects said front door in said open position.

6. The center-matched double hinged door assembly as defined in claim 1, wherein said door lock means comprises a latch slider installed to a front end of said rear door and forced to retractably project from said rear door and a stopper fixedly disposed on a rear end of said front door, said stopper engaging said latch slider while said front and rear doors are in said closed position so as thereby to prevent said rear door from moving toward said open position, said latch slider having a front end facing said front door so shaped that, during movement of said rear door to said closed position while said front door is in said closed position, said latch slider is forced back into said rear door by said stopper and is brought into said engagement with said stopper when said rear door reaches completely said closed position.

7. A center-matched double hinged door assembly for a vehicle body having a continuous aperture as a doorway formed at each of opposite sides of the vehicle body, said double hinged door assembly being movable between a closed position wherein the double hinged door assembly fully closes the continuous aperture and an open position wherein the double hinged door assembly fully opens the continuous aperture, said double hinged door assembly comprising:
- a front door adapted to be hinged at a front end of said front door to the vehicle body, said front door is movable between said closed position wherein said front door closes a front part of the continuous aperture and said open position wherein said front door opens said front part of the continuous aperture;
- a rear door adapted to be hinged at a rear end of said rear door to the vehicle body, said rear door is movable between said closed position wherein said rear door closes a rear part of the continuous aperture and said open position wherein said rear door opens said rear part of the continuous aperture; and
- door lock means for preventing said rear door from moving to said open position while said front door is in said closed position, allowing said rear door to move to said open position while said front door is in said open position and allowing said rear door to move to said closed position irrespective of said closed and open positions of said front door;
- wherein said door lock means further comprises door position detection means for detecting said front door in said closed and open positions, and said door lock means allowing said rear door to move to said open position while said door position detection means detects said front door in said open position and preventing said rear door from moving to said open position while said door position detection means detects said front door in said closed position.

8. The center-matched double hinged door assembly as defined in claim 7, wherein said door lock means comprises a rear door handle installed to said rear door and operative to unlock said rear door, a door lock unit operative to lock said rear door to said vehicle body when said rear door moves to said closed position and to keep said rear door locked to said vehicle body until said rear door handle is operated, and an interlocking mechanism disposed in said rear door and operationally coupling said rear door handle to said door lock unit together to connect operation of said rear door handle to said door lock unit so as thereby to allow said door look unit to unlock said rear door from said vehicle body upon said operation of said rear door handle while said door position detection means detects said front door in said open position and operationally uncoupling said rear door handle from said door lock unit to disconnect said operation of said rear door handle so as thereby to prevent to said door lock unit from unlocking said rear door from said vehicle door irrespective of said operation of said rear door handle while said door position detection means detects said front door in said closed position.

9. The center-matched double hinged door assembly as defined in claim 7, wherein said door lock means comprises a rear door handle installed to said rear door and operative to unlock said rear door, a door lock unit operative to lock said rear door to said vehicle body when said rear door moves to said closed position and to keep said rear door locked to said vehicle body until said rear door handle is operated, and an interlocking mechanism disposed in said rear door and mechanically connecting operation of said rear door handle to said door lock unit so as to unlock said rear door from said vehicle body upon said operation of said rear door handle, said interlocking mechanism being mechanically locked to prevent said operation of said rear door handle so as thereby to prevent said door lock unit from unlocking said rear door from said vehicle body while said door position detection means detects said front door in said closed position and being unlocked to allow said operation of said rear door handle so as thereby to unlock said rear door from said vehicle body upon said operation of said rear door handle while said door position detection means detects said front door in said open position.

10. The center-matched double hinged door assembly as defined in claim 7, wherein said door lock means comprises a rear door handle installed to said rear door and operative to unlock said rear door, a door lock unit operative to lock said rear door to said vehicle body when said rear door moves to said closed position and to keep said rear door locked to said vehicle body until said rear door handle is operated, and an interlocking mechanism disposed in said rear door and mechanically connecting operation of said rear door handle to said door lock unit so as to unlock said rear door from said vehicle body upon said operation of said rear door handle, said interlocking mechanism being frictionally braked to prevent said operation of said rear door handle so as thereby to prevent said door lock unit from unlocking said rear door from said vehicle body while said door position detection means detects said front door in said closed position and being released to allow said operation of said rear door handle so as thereby to unlock said rear door from said vehicle body upon said operation of said rear door handle while said door position detection means detects said front door in said open position.

11. A center-matched double hinged door assembly for a vehicle body having a continuous aperture as a doorway formed at each of opposite sides of the vehicle body, said double hinged door assembly being movable between a closed position wherein the double hinged door assembly fully closes the continuous aperture and an open position wherein the double hinged door assembly fully opens the continuous aperture, said double hinged door assembly comprising:

a front door adapted to be hinged at a front end of said front door to the vehicle body, said front door is movable between said closed position wherein said front door closes a front part of the continuous aperture and said open position wherein said front door opens said front part of the continuous aperture;

a rear door adapted to be hinged at a rear end of said rear door to the vehicle body, said rear door is movable between said closed position wherein said rear door closes a rear part of the continuous aperture and said open position wherein said rear door opens said rear part of the continuous aperture; and door lock means for preventing said rear door from moving to said open position while said front door is in said closed position, allowing said rear door to move to said open position while said front door is in said open position and allowing said rear door to move to said closed position irrespective of said closed and open positions of said front door;

wherein said door lock means comprises a latch slider installed to a front end of said rear door and forced to retractably project from said rear door and a stopper fixedly disposed on a rear end of said front door, said stopper engaging said latch slider while said front and rear doors are in said closed position so as thereby to prevent said rear door from moving toward said open position, said latch slider having a front end facing said front door so shaped that, during movement of said rear door to said closed position while said front door is in said closed position, said latch slider is forced back into said rear door by said stopper and is brought into said engagement with said stopper when said rear door reaches completely said closed position.

* * * * *